United States Patent
Ejima

(10) Patent No.: US 10,649,698 B2
(45) Date of Patent: May 12, 2020

(54) INFORMATION PROCESSING APPARATUS CONFIGURED TO DETERMINE A TRANSMISSION SOURCE DEVICE OF A PACKET AND INFORMATION PROCESSING METHOD

(71) Applicant: Takeshi Ejima, Tokyo (JP)

(72) Inventor: Takeshi Ejima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/268,607

(22) Filed: Feb. 6, 2019

(65) Prior Publication Data
US 2019/0286378 A1  Sep. 19, 2019

(30) Foreign Application Priority Data

Mar. 19, 2018 (JP) .................. 2018-051713

(51) Int. Cl.
| G06F 3/12 | (2006.01) |
| H04L 12/26 | (2006.01) |
| G06K 15/00 | (2006.01) |
| H04L 29/06 | (2006.01) |

(52) U.S. Cl.
CPC ........... *G06F 3/1203* (2013.01); *G06F 3/1276* (2013.01); *G06F 3/1279* (2013.01); *G06K 15/403* (2013.01); *H04L 43/04* (2013.01); *H04L 69/16* (2013.01)

(58) Field of Classification Search
None
See application file for complete search history.

(56) References Cited

U.S. PATENT DOCUMENTS

2006/0083227 A1*  4/2006  Eldar ................. H04L 49/25
370/389
2018/0101348 A1*  4/2018  Ota ................... H04L 61/2517

FOREIGN PATENT DOCUMENTS

| JP | 2010-098640 | 4/2010 |
| JP | 2015-126445 | 7/2015 |

* cited by examiner

*Primary Examiner* — Lennin R Rodriguezgonzalez
(74) *Attorney, Agent, or Firm* — Harness, Dickey and Pierce, P.L.C.

(57) ABSTRACT

An information processing apparatus connected to a plurality of networks, includes: a plurality of device drivers each of which is receives a packet from each of the networks; and circuitry determines a network to which a transmission source device of the packet belongs based on information indicating which of the device drivers has received the packet.

10 Claims, 3 Drawing Sheets

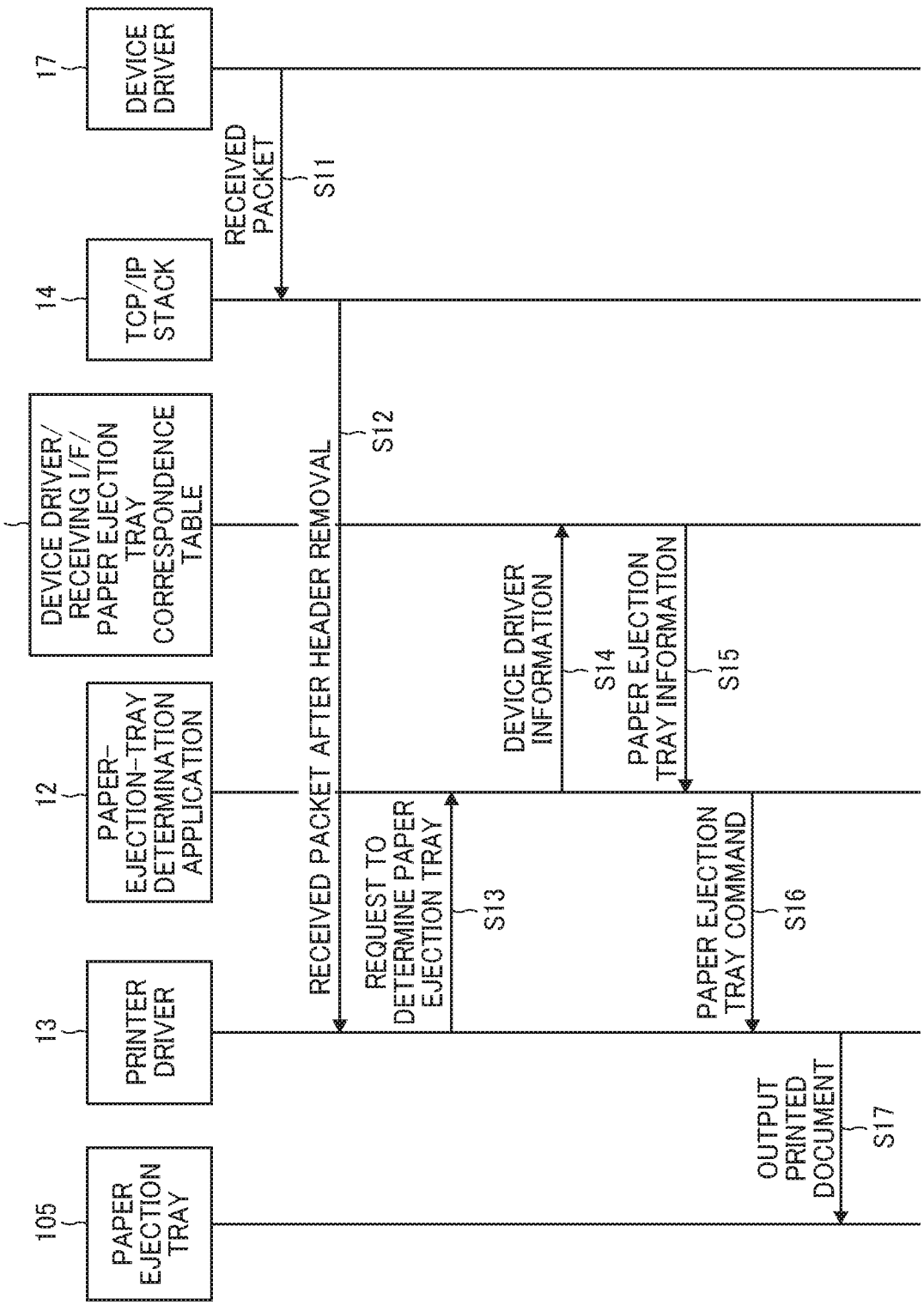

INFORMATION PROCESSING APPARATUS CONFIGURED TO DETERMINE A TRANSMISSION SOURCE DEVICE OF A PACKET AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2018-051713, filed on Mar. 19, 2018, in the Japan Patent Office, the entire disclosure of which is hereby incorporated by reference herein.

BACKGROUND

Technical Field

The present invention relates to an information processing apparatus and an information processing method.

Description of the Related Art

In office buildings, a plurality of companies may have bases on the same floor, for example. In such a case, it is common to have at least one independent network for each company. Meanwhile, there is a need for sharing one printer with a plurality of companies, that is, a plurality of networks in view of management costs and the occupied area. When a single printer is shared by a plurality of companies, documents are output to individual paper ejection trays allocated to individual transmission source networks. It is thus necessary to distinguish the transmission source networks.

SUMMARY

Example embodiments include an information processing apparatus connected to a plurality of networks, including: a plurality of device drivers each of which is receives a packet from each of the networks; and circuitry determines a network to which a transmission source device of the packet belongs based on information indicating which of the device drivers has received the packet.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a sequence diagram explaining a procedure of outputting a printed document according to the embodiment of the present invention.

Figure 1:
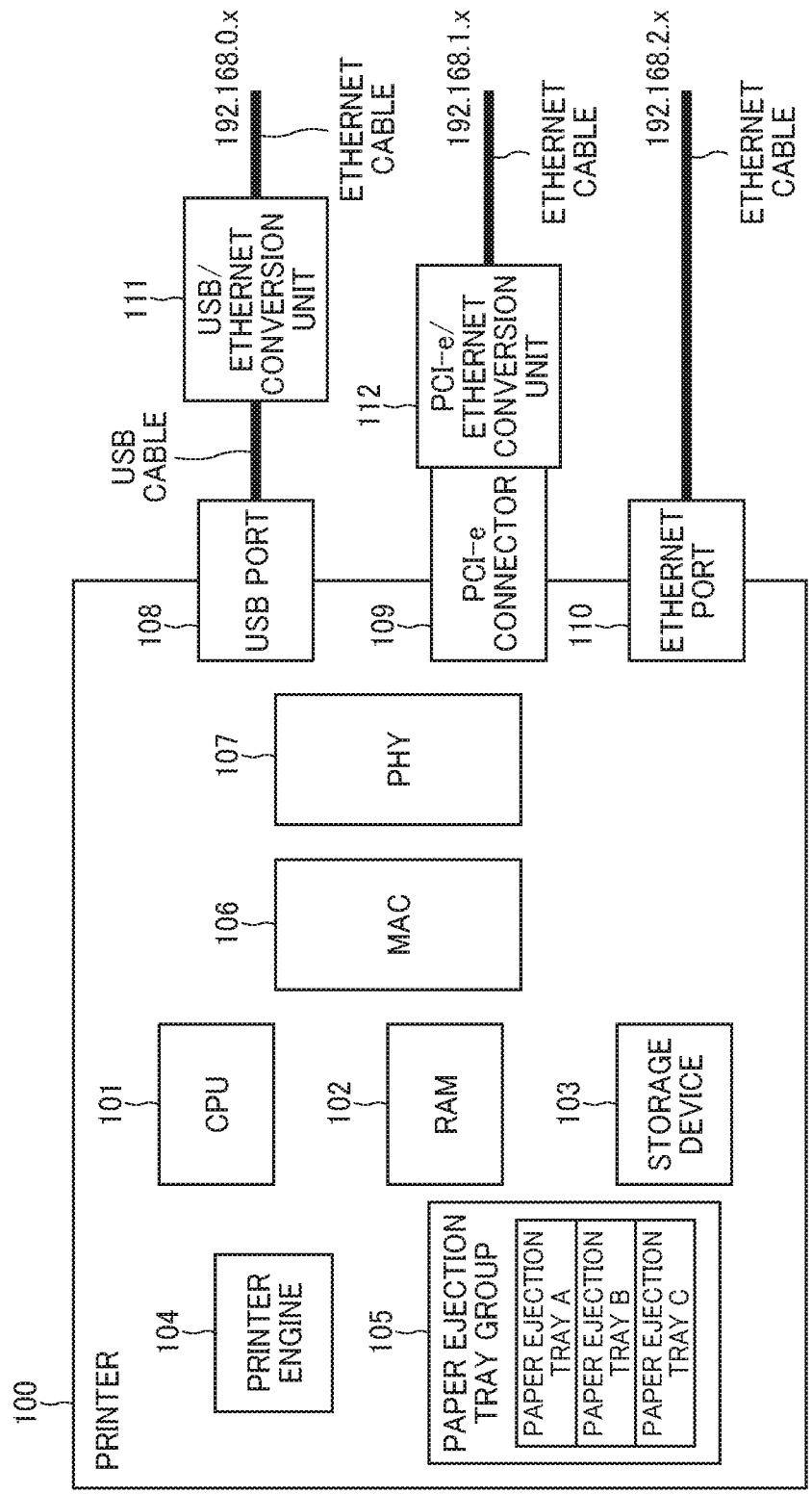
FIG. 1 is a diagram illustrating a hardware configuration example of a printer according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

One or more embodiments of the present invention will be described hereinafter with reference to the drawings.

FIG. 1 is a diagram illustrating a hardware configuration example of a printer 100 according to an embodiment of the present invention. As illustrated in FIG. 1, the printer 100 includes a CPU (Central Processing Unit) 101, a RAM (Random Access Memory) 102, a storage device 103, a printer engine 104, a paper ejection tray group 105, a MAC (Media Access Control) 106, a PHY (Physical Layer) 107, a USB (Universal Serial Bus) port 108, a PCI-e (PCI EXPRESS (Registered Trademark)) connector 109, an Ethernet (Registered Trademark) port 110, a USB/Ethernet conversion unit 111, and a PCI-e/Ethernet conversion unit 112.

The CPU 101 executes programs stored in the storage device 103 to control the printer 100. The storage device 103 is a non-volatile memory that stores programs and data necessary for causing the printer 100 to operate. The RAM 102 is a volatile storage device that stores programs to be read from the storage device 103, results of calculations by the CPU 101, and the like. The printer engine 104 is hardware that performs printing based on data acquired. The paper ejection tray group 105 is a group of trays to which a printed sheet is output. As illustrated in FIG. 1, the paper ejection tray group 105 includes a paper ejection tray A, a paper ejection tray B, and a paper ejection tray C. The MAC 106 performs MAC layer processing in a wired or wireless LAN (local area network). The PHY 107 performs physical layer processing in the wired or wireless LAN, and performs conversion between a digital signal and an electric signal of a transmission/reception frame and the like.

The USB port 108 is used for connecting to a USB device. The PCI-e connector 109 is used for attachment of a PCI-express device. The Ethernet port 110 is used for connecting to an Ethernet device. The USB/Ethernet conversion unit 111 performs interface conversion for connecting an Ethernet device to the USB port 108. The PCI-e/Ethernet conversion unit 112 performs interface conversion for connecting an Ethernet device to the PCI-e connector 109.

As illustrated in FIG. 1, the IP address of a network connected by the USB/Ethernet conversion unit 111 is "192.168.0.x". The IP address of a network connected by the PCI-e/Ethernet conversion unit 112 is "192.168.1.x". The IP address of a network connected by the Ethernet port 110 is "192.168.2.x".

Figure 2:
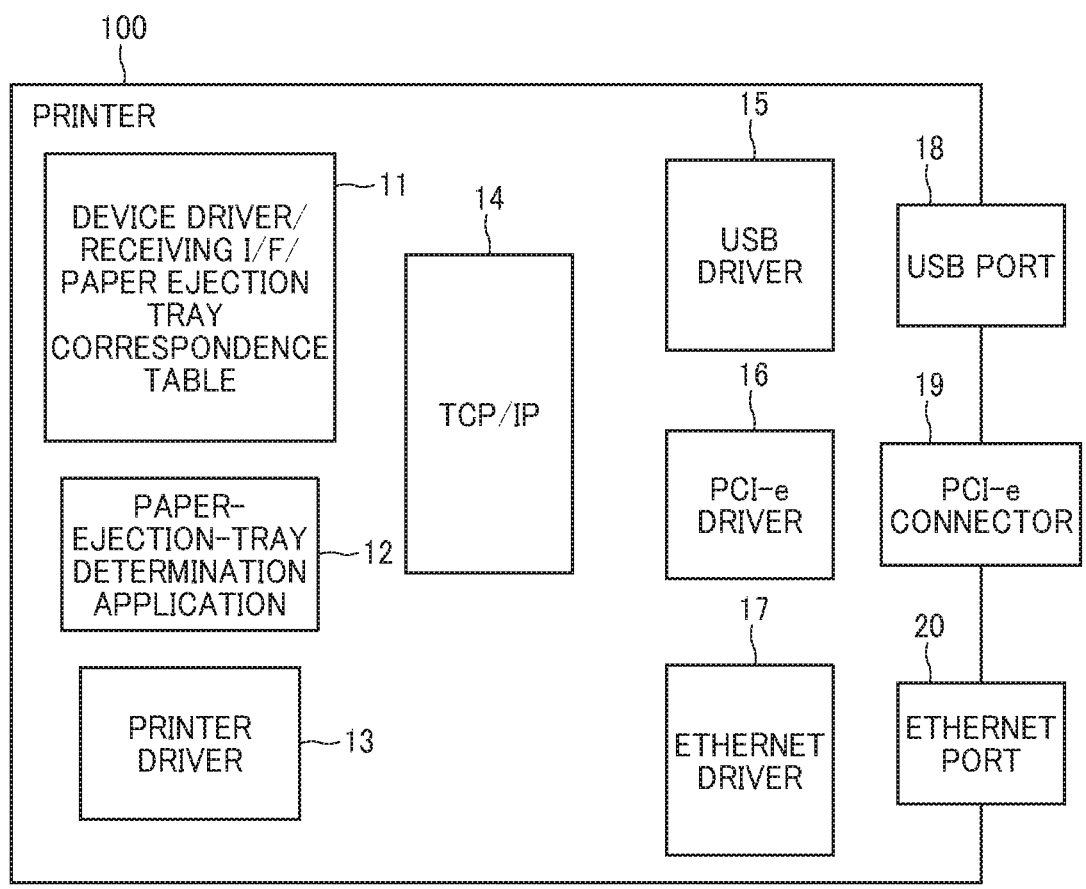
FIG. 2 is a diagram illustrating a functional configuration example of the printer according to the embodiment of the present invention.

FIG. 2 is a diagram illustrating a functional configuration example of the printer 100 according to the embodiment of the present invention. As illustrated in FIG. 2, the printer 100 includes a device driver/receiving I/F/paper ejection tray correspondence table 11 (hereinafter, referred to as "correspondence table 11"), a paper-ejection-tray determination application 12, a printer driver 13, a TCP/IP (Transmission Control Protocol/Internet Protocol) 14, a USB driver 15, a PCI-e driver 16, an Ethernet driver 17, a USB port 18, a PCI-e connector 19, and an Ethernet port 20. At least one of these functional units may be achieved by a process performed by the CPU 101 based on a program.

The printer 100 refers to information stored in the correspondence table 11 based on information indicating which device driver has received a packet, and determines a paper ejection tray that is the output destination of a printed sheet. Table 1 is an example of the device driver/receiving I/F/paper ejection tray correspondence table 11.

TABLE 1

| DEVICE DRIVER | INTERFACE | PAPER EJECTION TRAY GROUP |
|---|---|---|
| USB DRIVER 15 | USB | PAPER EJECTION TRAY A |
| PCI-e DRIVER 16 | PCI-Express | PAPER EJECTION TRAY B |
| ETHERNET DRIVER 17 | ETHERNET | PAPER EJECTION TRAY C |

As illustrated in Table 1, a device driver, an interface, and a paper ejection tray are associated with each other. "USB driver 15" is associated with the USB port 18 and the paper ejection tray A. "PCI-e driver 16" is associated with the PCI-Express (the PCI-e connector 19) and the paper ejection tray B. "Ethernet driver 17" is associated with the Ethernet port 20 and the paper ejection tray C. If a device driver that has received a packet is determined, the corresponding interface is uniquely determined. Consequently, it is possible to determine the paper ejection tray associated with the device having received the packet or the corresponding interface as the output destination paper ejection tray.

An IP address indicating the network in FIG. 1 may be associated with the device driver in Table 1, for example. That is, "192.168.0.x" may be associated with "USB driver 15", "192.168.1.x" may be associated with "PCI-e driver 16", and "192.168.2.x" may be associated with "Ethernet driver 17". These device drivers and interfaces are merely examples, and other interfaces, for example, device drivers controlling IEEE 1394 or the like may be used.

When the printer 100 receives a packet, the paper-ejection-tray determination application 12 detects a signal from the device driver used when the packet is received, thus acquiring information indicating from which device driver the packet is received. When receiving a request to determine a paper ejection tray from the printer driver 13, the paper-ejection-tray determination application 12 refers to the correspondence table 11 based on the device driver information acquired to determine a paper ejection tray that is the output destination of a printed sheet, and notifies the printer driver 13 of the determined paper ejection tray to which the printed sheet is output.

The printer driver 13 performs printing and transmits a request to determine a paper ejection tray to the paper-ejection-tray determination application 12. The printer driver 13 then ejects a printed sheet to the paper ejection tray specified by the paper-ejection-tray determination application 12.

The TCP/IP 14 has a capability of providing a transport layer and an Internet layer in the TCP/IP protocol, and controls transmission and reception data.

The USB driver 15 controls transmission and reception of data via the USB port 18. The PCI-e driver 16 controls transmission and reception of data via the PCI-e connector 19. The Ethernet driver 17 controls transmission and reception of data via the Ethernet port 20. It is not necessary to store interface information in the correspondence table 11.

FIG. 3 is a sequence diagram explaining a procedure of outputting a printed document according to the embodiment of the present invention. As an example, an operation when a packet including printing data is received via Ethernet will be described with reference to FIG. 3. When the packet including printing data is received via another interface, the device driver is changed to a device driver supporting the interface.

At step S11, the device driver, that is, the Ethernet driver 17 transmits a received packet to the TCP/IP stack 14. The paper-ejection-tray determination application 12 acquires information indicating which of the USB driver 15, the PCI-e driver 16, and the Ethernet driver 17 has received the packet. As an example, as described above, it is possible to specify which device driver has received the packet by detecting a signal from the device driver having received the packet. The TCP/IP stack 14 then transmits the received packet after header removal to the printer driver 13 (S12). The printer driver 13 transmits a request to determine a paper ejection tray to the paper-ejection-tray determination application 12 (S13).

At step S14, the paper-ejection-tray determination application 12 refers to information (device driver information) indicating which device driver has received the packet, which is acquired at step S11, and the correspondence table 11 to determine a paper ejection tray to which a sheet is to be ejected when printing data contained in the packet is printed (S15). In this example, the Ethernet driver 17 has received the packet, and thus the paper-ejection-tray determination application 12 determines that a sheet on which the printing data contained in the corresponding packet is printed is ejected to the paper ejection tray C based on the association in Table 1. That is, as the packet is received by the Ethernet driver 17, the paper-ejection-tray determination application 12 can determine that the network to which the transmission source device of the packet belongs is "192.168.2.x" in FIG. 1.

At step S16, the paper-ejection-tray determination application 12 transmits a paper ejection tray command including information indicating that a sheet is ejected to the paper ejection tray C determined at step S15 to the printer driver 13. The printer driver 13 then prints the printing data contained in the packet on a sheet based on the paper ejection tray command received and ejects the sheet to the paper ejection tray C (S17).

As described above, according to the embodiment of the present invention, based on information indicating which device driver has received a packet and information in which a predetermined device driver is associated with a paper ejection tray, the printer 100 can determine the network to which the transmission source device of the packet belongs, print printing data contained in the packet, and eject a sheet having the printing data printed thereon to an appropriate paper ejection tray.

That is, it is possible to accurately determine the network to which the transmission source device of the packet belongs.

For example, when the printer cannot distinguish the transmission source networks, printed documents output from a plurality of networks and a plurality of companies are mixed in a single paper ejection tray. This leads to a risk that confidential documents may be viewed or taken away by people outside the company. In an apparatus that receives transmissions from a plurality of networks, it has been possible to analyze, using a conventional technique, a transmission source network by the transmission source MAC (Media Access Control) address of a packet received for the purpose of distinguishing the transmission source networks.

In the conventional method of analyzing a received packet to specify the transmission source network, however, when the MAC address of a packet transmitted by a transmission source device corresponds one-to-one to the transmission source network, if there are two or more devices connected to a certain network, it was necessary to have a router or the like so that the MAC addresses of packets transmitted from these devices are converted into the MAC address of a single device.

According to the above-described embodiment, without requiring a router or the like, the network to which the transmission source device of the packet belongs can be accurately determined.

While the case where printed sheets for a plurality of companies are mixed is descried as an example, the above-described embodiment is applicable to a case where printed sheets for a plurality of organizations of any type are mixed, or a plurality of uses are mixed, depending on how the network system is constructed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus connected to a plurality of networks, comprising:
   a plurality of device drivers each of which is configured to receive a packet from each of the networks;
   a plurality of interfaces corresponding to respective ones of the plurality of the device drivers; and
   processing circuitry configured to determine a source network from among the plurality of networks to which a transmission source device of the packet belongs based on information indicating which of the plurality of interfaces has received the packet.

2. The information processing apparatus according to claim 1, further comprising:
   a printer engine configured to print data to be printed in the packet; and
   a plurality of paper ejection trays, wherein
      the processing circuitry is configured to determine, based on the source network, which of the plurality of paper ejection trays ejects a sheet having an image formed thereon using the data to be printed in the packet.

3. The information processing apparatus according to claim 2, further comprising:
   a memory configured to store association information associating the plurality of device drivers with of the plurality of paper ejection trays, wherein
      the processing circuitry is configured to determine which of the plurality of paper ejection trays ejects the sheet based on the association information.

4. The information processing apparatus according to claim 3, wherein the association information further associates the plurality of networks to the plurality of paper ejection trays.

5. The information processing apparatus according to claim 1, further comprising:
   a memory configured to store association information associating the networks, the interfaces, and paper ejection trays.

6. An information processing method performed by an information processing apparatus connected to a plurality of networks, the information processing apparatus including a plurality of device drivers each of which is configured to receive a packet from each of the networks and a plurality of interfaces corresponding to respective ones of the plurality of the device drivers, the information processing method comprising:
   acquiring information indicating which of the plurality of interfaces corresponding to respective ones of the plurality of the device drivers has received the packet; and
   determining a source network from among the plurality of networks to which a transmission source device of the packet belongs based on the information indicating which of the plurality of interfaces has received the packet.

7. The information processing method of claim 6, wherein information processing apparatus further includes a printer engine configured to print data to be printed in the packet and a plurality of paper ejection trays, and the method further comprises:
   determining, based on the source network, which of the plurality of paper ejection trays ejects a sheet having an image formed thereon using the data to be printed in the packet.

8. The information processing method according to claim 7, further comprising:
   storing, in a memory, association information associating the plurality of device drivers with plurality of the paper ejection trays; and
   determining which of the plurality of paper ejection trays ejects the sheet based on the association information.

9. The information processing method according to claim 8, wherein the association information further associates the plurality of networks to the plurality of paper ejection trays.

10. The information processing method according to claim 6, further comprising:
    storing, in a memory, association information associating the networks, the interfaces, and a set of paper ejection trays.

* * * * *